United States Patent
Medisetti et al.

(10) Patent No.: US 11,403,267 B2
(45) Date of Patent: Aug. 2, 2022

(54) DYNAMIC TRANSFORMATION CODE PREDICTION AND GENERATION FOR UNAVAILABLE DATA ELEMENT

(71) Applicant: Bank of America Corporation, Charlotte, NC (US)

(72) Inventors: Venkata Durga Rao Medisetti, Hyderabad (IN); Samson Paulraj, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 94 days.

(21) Appl. No.: 16/921,078

(22) Filed: Jul. 6, 2020

(65) Prior Publication Data
US 2022/0004528 A1 Jan. 6, 2022

(51) Int. Cl.
| G06F 16/00 | (2019.01) |
| G06F 16/215 | (2019.01) |
| G06F 17/15 | (2006.01) |
| G06N 20/20 | (2019.01) |
| G06F 16/25 | (2019.01) |

(52) U.S. Cl.
CPC .......... *G06F 16/215* (2019.01); *G06F 16/254* (2019.01); *G06F 17/15* (2013.01); *G06N 20/20* (2019.01)

(58) Field of Classification Search
None
See application file for complete search history.

(56) References Cited

U.S. PATENT DOCUMENTS

| 6,480,832 | B2 | 11/2002 | Nakisa |
| 7,283,982 | B2 | 10/2007 | Pednault |
| 7,720,782 | B2 | 5/2010 | Chaudhury et al. |
| 9,443,194 | B2 | 9/2016 | Chu et al. |
| 2001/0044766 | A1 | 11/2001 | Keyes |
| 2004/0167765 | A1 | 8/2004 | Abu El Ata |
| 2005/0234753 | A1 | 10/2005 | Pinto et al. |
| 2014/0207493 | A1 | 7/2014 | Sarrafzadeh et al. |
| 2015/0088907 | A1 | 3/2015 | Li et al. |
| 2015/0170055 | A1 | 6/2015 | Beymer et al. |
| 2017/0243140 | A1 | 8/2017 | Achin et al. |
| 2017/0372232 | A1 | 12/2017 | Maughan et al. |

(Continued)

*Primary Examiner* — Bai D Vu
(74) *Attorney, Agent, or Firm* — Banner & Witcoff, Ltd.

(57) ABSTRACT

Aspects of the disclosure relate to dynamic transformation code prediction and generation for an unavailable data element. In some embodiments, a computing platform may execute an extract, transform, and load process on input data received from a plurality of data sources and detect a missing data element in the received input data. Subsequently, the computing platform may generate a prediction model with respect to the missing data element, which may include executing a first, second, and third machine learning algorithm. Next, the computing platform may determine a confidence level of the prediction model. In response to determining that the confidence level is at or above the predetermined threshold, the computing platform may generate executable transformation code implementing the prediction model. Thereafter, the computing platform may monitor transformation code implementations and execute a fourth machine learning algorithm to adjust the prediction model based on the transformation code implementations.

16 Claims, 8 Drawing Sheets

(56) References Cited

U.S. PATENT DOCUMENTS

| | | |
|---|---|---|
| 2018/0081914 A1 | 3/2018 | Zoll et al. |
| 2018/0322414 A1 | 11/2018 | Jayaraman |
| 2020/0057708 A1 | 2/2020 | Joshi et al. |
| 2020/0081759 A1 | 3/2020 | Chang et al. |
| 2020/0082283 A1 | 3/2020 | Moon et al. |
| 2020/0090075 A1 | 3/2020 | Achin et al. |
| 2020/0125635 A1 | 4/2020 | Nuolf et al. |
| 2020/0193220 A1 | 6/2020 | Chen |
| 2021/0200749 A1* | 7/2021 | Sghiouer ............... G06F 16/215 |

\* cited by examiner

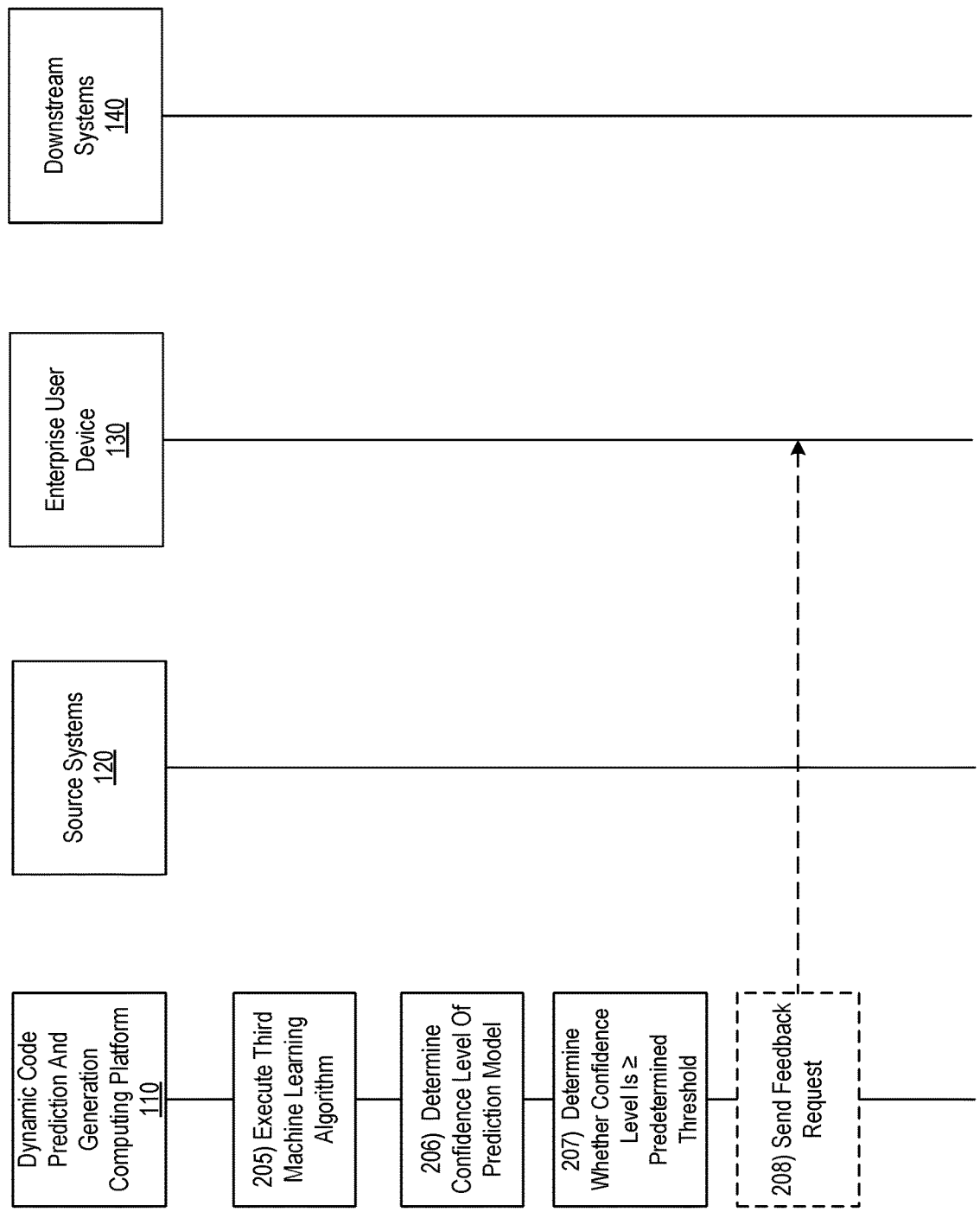

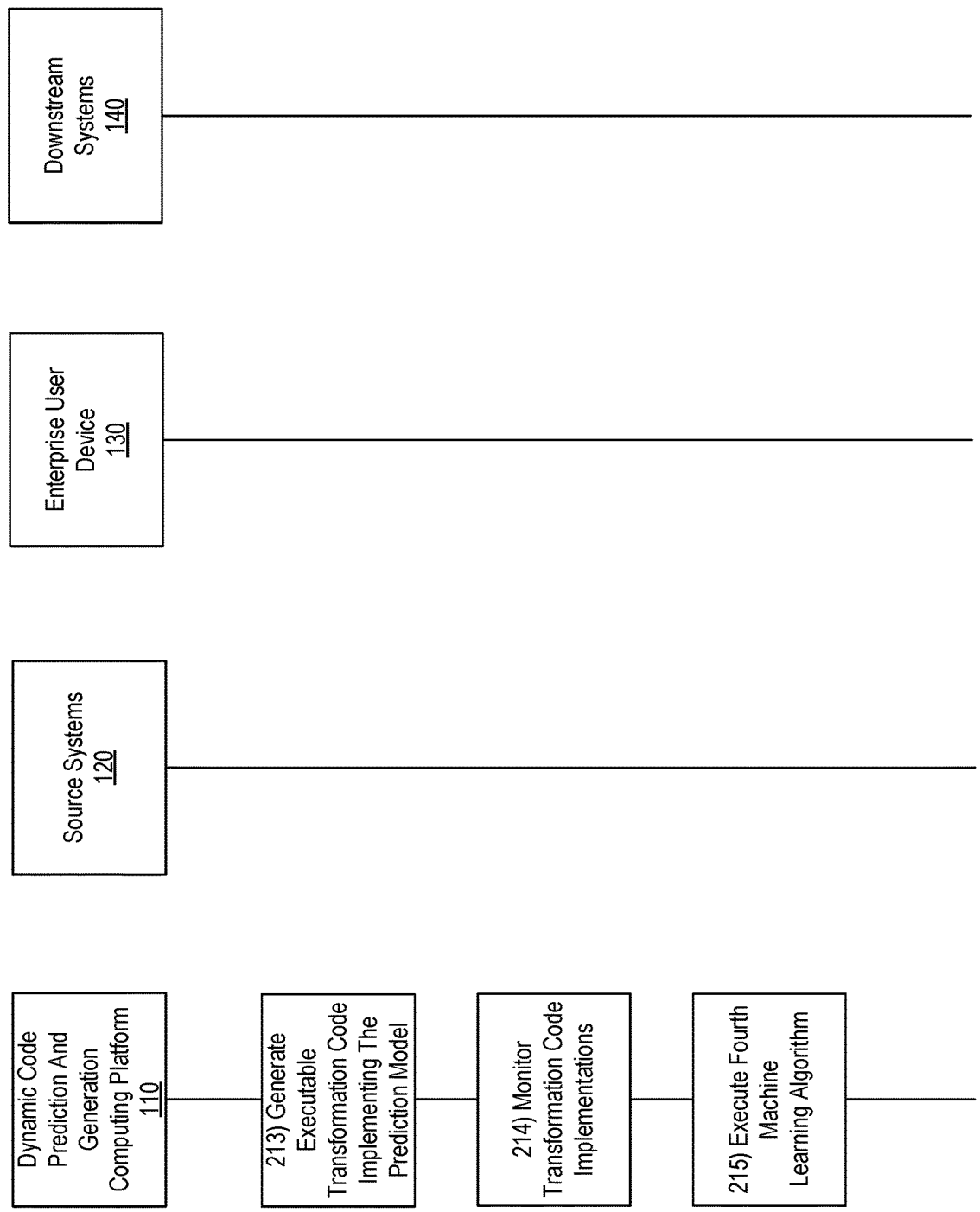

DYNAMIC TRANSFORMATION CODE PREDICTION AND GENERATION FOR UNAVAILABLE DATA ELEMENT

BACKGROUND

Aspects of the disclosure relate to data processing, machine learning, and developing and deploying intelligent systems that support software development and quality assurance processes. In particular, one or more aspects of the disclosure relate to dynamic transformation code prediction and generation for an unavailable data element.

Missing data is a problem that can affect software quality assurance processes. For example, fields with missing data (e.g., not populated) or that are populated with junk or unexpected data often cause problems in software development processes and in production deployments. In many instances, it may be difficult to trace back to source systems where the specific missing data originated to regenerate the information. Further, immediate code changes to produce the missing data may not be possible without proper testing and implementation. In addition, in many instances, records with missing data are skipped from processing and/or handled separately, which may cause data aggregation issues, data processing issues, and/or other similar technical issues to arise.

SUMMARY

Aspects of the disclosure provide effective, efficient, scalable, and convenient technical solutions that address and overcome the technical problems associated with developing and deploying intelligent systems that support software development and quality assurance processes. In particular, one or more aspects of the disclosure provide dynamic transformation code prediction and generation for an unavailable data element.

In accordance with one or more embodiments, a computing platform having at least one processor, a memory, and a communication interface may execute an extract, transform, and load process on input data received from a plurality of data sources. Subsequently, the computing platform may detect a missing data element in the input data received from the plurality of data sources. Thereafter, the computing platform may generate a prediction model with respect to the missing data element. In addition, generating the prediction model may include executing a first machine learning algorithm to analyze stored historical information associated with the missing data element, executing a second machine learning algorithm to classify available information from the input data received from the plurality of data sources, and executing a third machine learning algorithm to correlate relationships between the missing data element and the available information from the input data received from the plurality of data sources. Then, the computing platform may determine a confidence level of the prediction model, indicating a level of confidence that the prediction model is accurate. Next, the computing platform may determine whether the confidence level is at or above a predetermined threshold. In response to determining that the confidence level is at or above the predetermined threshold, the computing platform may generate executable transformation code implementing the prediction model. Subsequently, the computing platform may monitor transformation code implementations. Then, the computing platform may execute a fourth machine learning algorithm to adjust the prediction model based on the transformation code implementations.

In some embodiments, the computing platform may, in response to determining that the confidence level is below the predetermined threshold: send, via the communication interface, a feedback request to a computing device associated with a subject matter expert, the feedback request requesting the subject matter expert to perform a validation operation on the prediction model; receive, from the computing device associated with the subject matter expert, proposed modifications to the prediction model; and update the prediction model based on the proposed modifications.

In some embodiments, generating the prediction model with respect to the missing data element may include generating a predicted value.

In some embodiments, generating the prediction model with respect to the missing data element may include generating transformation logic capable of deriving a missing value.

In some embodiments, the computing platform may: receive first transformation metrics for the transformation code implementations; evaluate the transformation code implementations and prior code implementations based on the first transformation metrics and second transformation metrics for the prior code implementations; and based on evaluating the transformation code implementations and the prior code implementations, select an optimal transformation code from amongst the transformation code implementations and the prior code implementations.

In some embodiments, receiving the first transformation metrics for the transformation code implementations may include receiving information indicating success rates associated with the transformation code implementations, accuracy associated with the transformation code implementations, risk aspects associated with the transformation code implementations, or user acceptance associated with the transformation code implementations.

In some embodiments, the missing data element may include junk data or unexpected data.

In some embodiments, executing the first machine learning algorithm may include executing a supervised training algorithm.

In some embodiments, executing the first machine learning algorithm may include generating a predicted value using linear regression and adaptive boosting.

In some embodiments, executing the second machine learning algorithm may include generating a predicted value using an unsupervised clustering algorithm.

In some embodiments, executing the third machine learning algorithm may include generating transformation logic using one or more of: a data correlation algorithm, exploratory data analysis (EDA), or principal component analysis (PCA).

In some embodiments, the first machine learning algorithm, the second machine learning algorithm, the third machine learning algorithm, the fourth machine learning algorithm may include different machine learning algorithms.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2E depict an illustrative event sequence for dynamic transformation code prediction and generation for an unavailable data element in accordance with one or more example embodiments.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Figure 1A:
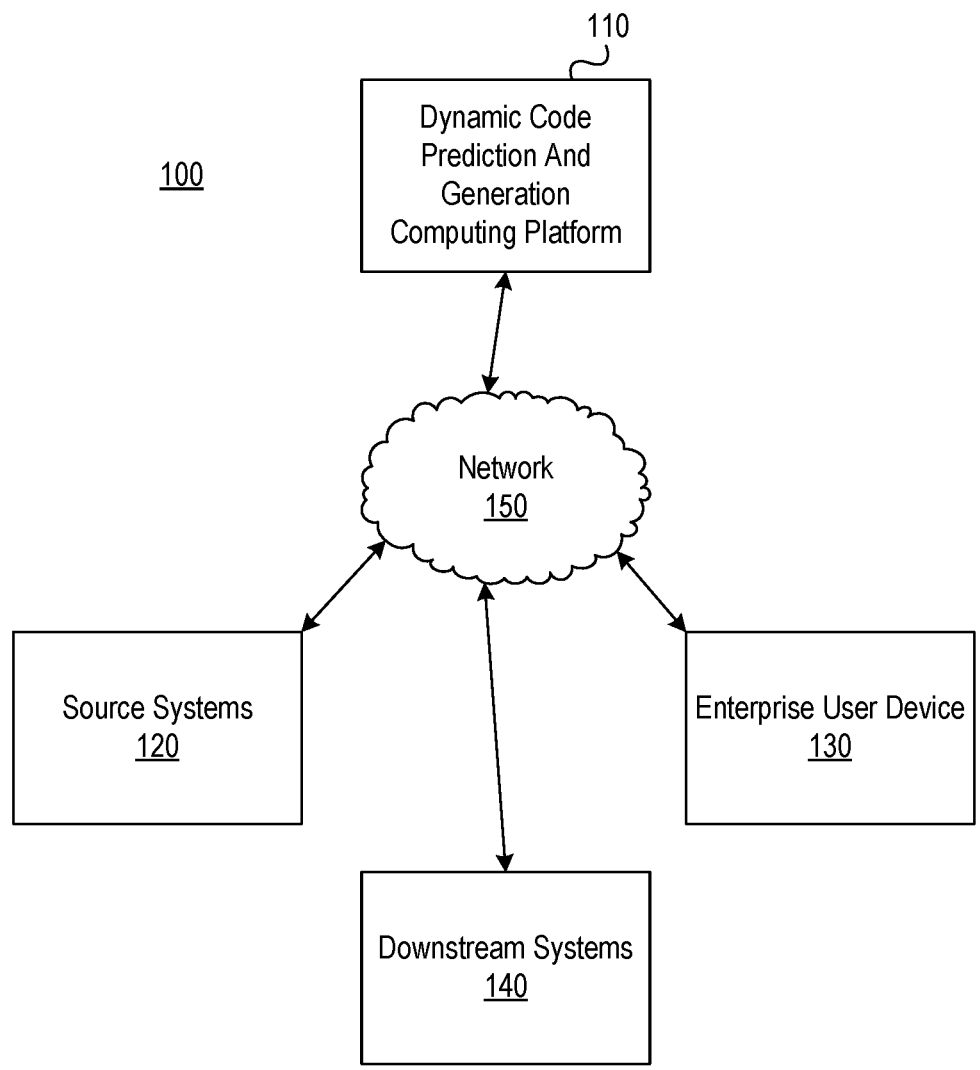
FIGS. 1A and 1B depict an illustrative computing environment for dynamic transformation code prediction and generation for an unavailable data element in accordance with one or more example embodiments.
Figure 1B:
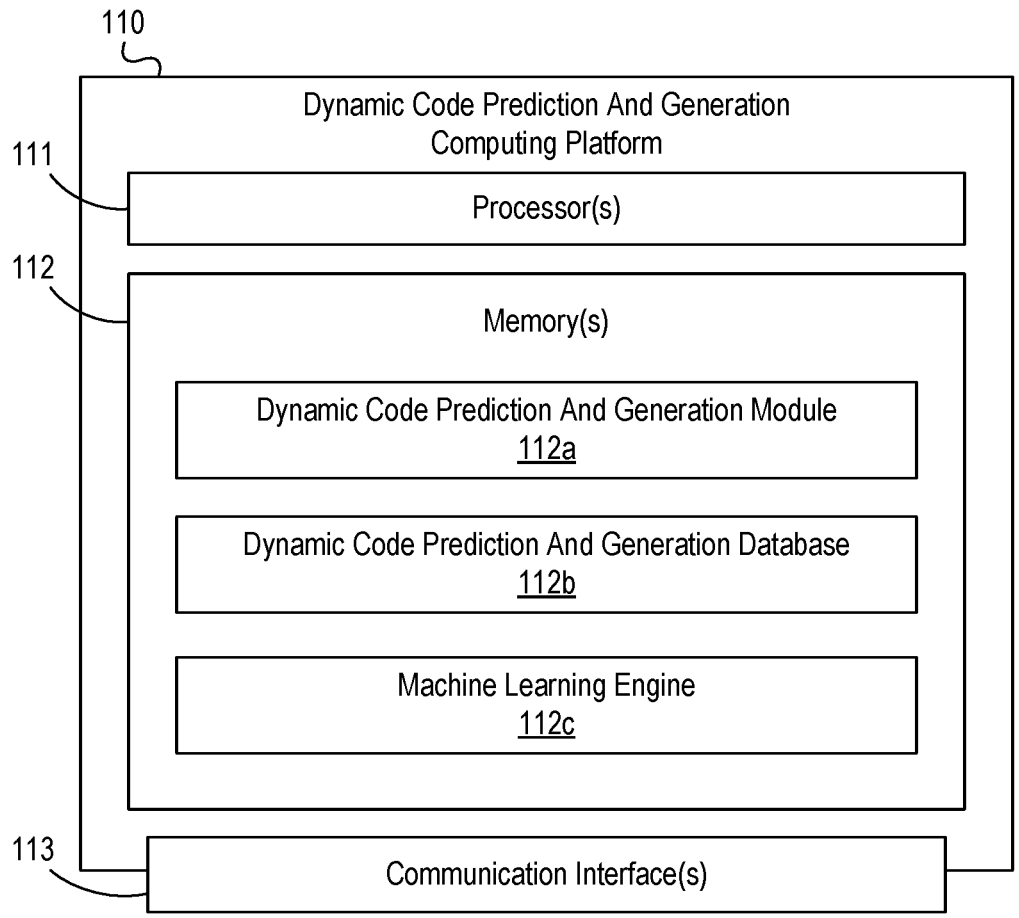

FIGS. 1A and 1B depict an illustrative computing environment for dynamic transformation code prediction and generation for an unavailable data element in accordance with one or more example embodiments. Referring to FIG. 1A, computing environment 100 may include one or more computing devices. For example, computing environment 100 may include a dynamic code prediction and generation computing platform 110, sources systems 120 (which may, e.g., be data sources), an enterprise user device 130, and downstream systems 140.

As illustrated in greater detail below, dynamic code prediction and generation computing platform 110 may include one or more computing devices configured to perform one or more of the functions described herein. For example, dynamic code prediction and generation computing platform 110 may include one or more computers (e.g., laptop computers, desktop computers, servers, server blades, or the like).

Source systems 120 may include one or more computer servers and/or other computer systems. In addition, source systems 120 may receive, host, store, and/or distribute data from various different sources, such as various data sources and/or reference data systems. Each source system may use a different data organization structure and/or format. Such data sources may include relational databases and flat files, but may also include non-relational database structures.

Enterprise user device 130 may be a server, desktop computer, laptop computer, tablet, mobile device, or the like, and may be associated with an enterprise organization operating dynamic code prediction and generation computing platform 110. For example, enterprise user device 130 may be configured to be used by a subject matter expert (SME) of computing environment 100. For example, the user device 130 may be configured to provide one or more user interfaces that enable the subject matter expert (who may, e.g., be a person or expert who is knowledgeable about the domain being represented and who may be associated with the enterprise organization) to use an application to perform a validation operation on a prediction model (e.g., in response to a feedback request) and to provide proposed modifications to the prediction model.

Downstream systems 140 may include one or more computer servers and/or other computer systems. In addition, downstream systems 140 may receive and store data from an extract, transform, and load (ETL) process performed on input data received from a plurality of data sources (e.g., source systems 120). Downstream systems 140 may include a system, application network, and/or other entity that may be configured to consume any and/or all of this data.

Computing environment 100 also may include one or more networks, which may interconnect one or more of dynamic code prediction and generation computing platform 110, source systems 120, enterprise user device 130, and downstream systems 140. For example, computing environment 100 may include network 150. Network 150 may include one or more sub-networks (e.g., local area networks (LANs), wide area networks (WANs), or the like). For example, network 150 may include a private sub-network that may be associated with a particular organization (e.g., a corporation, financial institution, educational institution, governmental institution, or the like) and that may interconnect one or more computing devices associated with the organization. For example, dynamic code prediction and generation computing platform 110, source systems 120, enterprise user device 130, and downstream systems 140 may be associated with an organization, and a private sub-network included in network 150 and associated with and/or operated by the organization may include one or more networks (e.g., LANs, WANs, virtual private networks (VPNs), or the like) that interconnect dynamic code prediction and generation computing platform 110, source systems 120, enterprise user device 130, and downstream systems 140. Network 150 also may include a public sub-network that may connect the private sub-network and/or one or more computing devices connected thereto (e.g., dynamic code prediction and generation computing platform 110, source systems 120, enterprise user device 130, and downstream systems 140) with one or more networks and/or computing devices that are not associated with the organization.

In one or more arrangements, dynamic code prediction and generation computing platform 110, source systems 120, enterprise user device 130, and downstream systems 140 may be any type of computing device capable of receiving a user interface, receiving input via the user interface, and communicating the received input to one or more other computing devices. For example, dynamic code prediction and generation computing platform 110, source systems 120, enterprise user device 130, downstream systems 140, and/or the other systems included in computing environment 100 may, in some instances, include one or more processors, memories, communication interfaces, storage devices, and/or other components. As noted above, and as illustrated in greater detail below, any and/or all of the computing devices included in computing environment 100 may, in some instances, be special-purpose computing devices configured to perform specific functions.

Referring to FIG. 1B, dynamic code prediction and generation computing platform 110 may include one or more processor(s) 111, memory(s) 112, and communication interface(s) 113. A data bus may interconnect processor 111, memory 112, and communication interface 113. Communication interface 113 may be a network interface configured to support communication between dynamic code prediction and generation computing platform 110 and one or more networks (e.g., network 150 or the like). Memory 112 may include one or more program modules having instructions that when executed by processor 111 cause dynamic code prediction and generation computing platform 110 to perform one or more functions described herein and/or one or more databases and/or other libraries that may store and/or otherwise maintain information which may be used by such program modules and/or processor 111.

In some instances, the one or more program modules and/or databases may be stored by and/or maintained in different memory units of dynamic code prediction and generation computing platform 110 and/or by different computing devices that may form and/or otherwise make up dynamic code prediction and generation computing platform 110. For example, memory 112 may have, store, and/or include a dynamic code prediction and generation module 112a, a dynamic code prediction and generation database 112b, and a machine learning engine 112c. Dynamic code prediction and generation module 112a may have instructions that direct and/or cause dynamic code prediction and generation computing platform 110 to generate a prediction model with respect to a missing data element and generate executable transformation code implementing the prediction model and/or perform other functions, as discussed in greater detail below. Dynamic code prediction and generation database 112b may store information used by dynamic code prediction and generation module 112a and/or dynamic code prediction and generation computing platform 110 in dynamic transformation code prediction and generation and/or in performing other functions. Machine learning engine 112c may have instructions that direct and/or cause dynamic code prediction and generation computing platform 110 to set, define, and/or iteratively redefine rules, techniques and/or other parameters used by dynamic code prediction and generation computing platform 110 and/or other systems in computing environment 100 in performing dynamic code prediction and generation using machine learning.

Figure 2A:
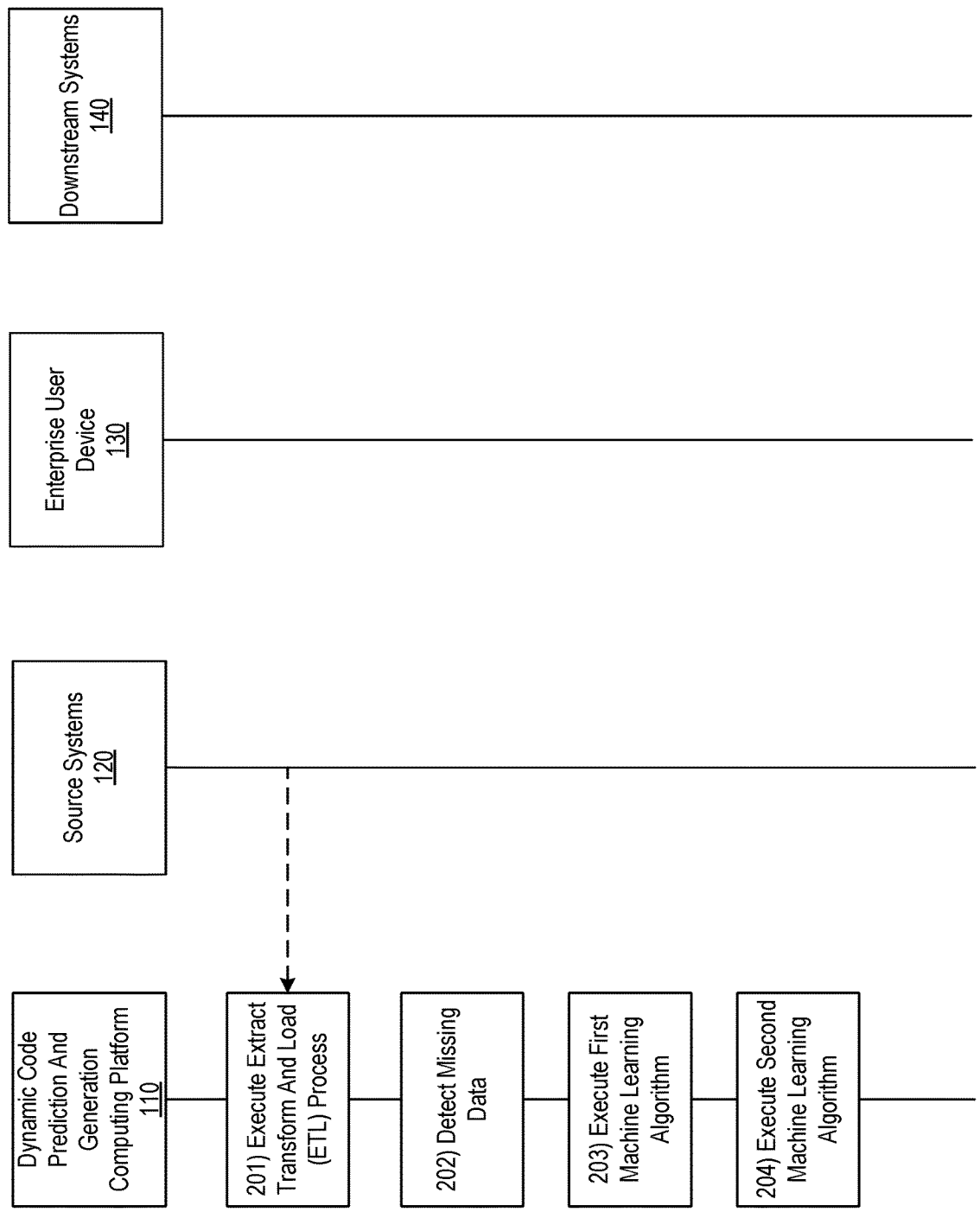

FIGS. 2A-2E depict an illustrative event sequence for dynamic transformation code prediction and generation for an unavailable data element in accordance with one or more example embodiments. Referring to FIG. 2A, at step 201, dynamic code prediction and generation computing platform 110 may execute an extract, transform, and load (ETL) process on input data received from a plurality of data sources (e.g., source systems 120). For example, the ETL process may include extracting data from multiple and/or different types of data sources, transforming the data to fit enterprise needs, and loading the data into an end target system (e.g., a data warehouse).

At step 202, dynamic code prediction and generation computing platform 110 may detect a missing data element in the input data received from the plurality of data sources. The missing data element may, for instance, include junk data or unexpected data that, when detected during job processing, may cause the job to fail or skip processing. Thus, in detecting that a data element is missing in the input data received from the plurality of data sources, dynamic code prediction and generation computing platform 110 may detect and/or otherwise identify that junk data or unexpected data is present in the input data received from the plurality of data sources.

Thereafter, at steps 203 through 205, dynamic code prediction and generation computing platform 110 may generate a prediction model with respect to the missing data element. In some embodiments, generating the prediction model with respect to the missing data element may include generating one or more of a predicted value or transformation logic capable of deriving a missing value. Specifically, in generating the prediction model, dynamic code prediction and generation computing platform 110 may, at step 203, execute a first machine learning algorithm to analyze stored historical information associated with the missing data element. In some embodiments, executing the first machine learning algorithm may include executing a supervised training algorithm. In some embodiments, executing the first machine learning algorithm may include generating a predicted value using linear regression and adaptive boosting. For example, the supervised training algorithm may process data from past execution instances and output programmable code defining the transformation logic.

Further, in generating the prediction model, dynamic code prediction and generation computing platform 110 may, at step 204, execute a second machine learning algorithm to classify available information from the input data received from the plurality of data sources. In some embodiments, executing the second machine learning algorithm may include generating a predicted value using an unsupervised clustering algorithm. Such unsupervised clustering techniques may, for instance, use a weighted Euclidian distance to re-evaluate centroid-based clusters to improve prediction results. For example, by executing an unsupervised clustering algorithm, dynamic code prediction and generation computing platform 110 may classify available information from the input data received from the plurality of data sources, such as classifying groups of records, to determine one or more components of the prediction model.

Further, in generating the prediction model, dynamic code prediction and generation computing platform 110 may, referring to FIG. 2B, at step 205, execute a third machine learning algorithm to correlate relationships between the missing data element and the available information from the input data received from the plurality of data sources. In some embodiments, executing the third machine learning algorithm may include generating transformation logic using one or more of: a data correlation algorithm, exploratory data analysis (EDA), or principal component analysis (PCA). For example, in generating the transformation logic, dynamic code prediction and generation computing platform 110 may correlate relationships between the missing data element and the available information from the input data received from the plurality of data sources, such as correlating related fields, to determine one or more components of the prediction model.

At step 206, dynamic code prediction and generation computing platform 110 may determine a confidence level of the prediction model, indicating a level of confidence that the prediction model is accurate. For example, dynamic code prediction and generation computing platform 110 may determine the confidence level by comparing outputs of one or more machine learning algorithms (e.g., the first machine learning algorithm, the second machine learning algorithm, and/or the third machine learning algorithm). At step 207, dynamic code prediction and generation computing platform 110 may determine whether the confidence level is at or above a predetermined threshold.

In some embodiments, at step 208, in response to determining that the confidence level is below the predetermined threshold, dynamic code prediction and generation computing platform 110 may send, via the communication interface (e.g., communication interface 113), a feedback request to a computing device associated with a subject matter expert (e.g., enterprise user device 130). In addition, the feedback request may request the subject matter expert to perform a validation operation on the prediction model.

Figure 2C:
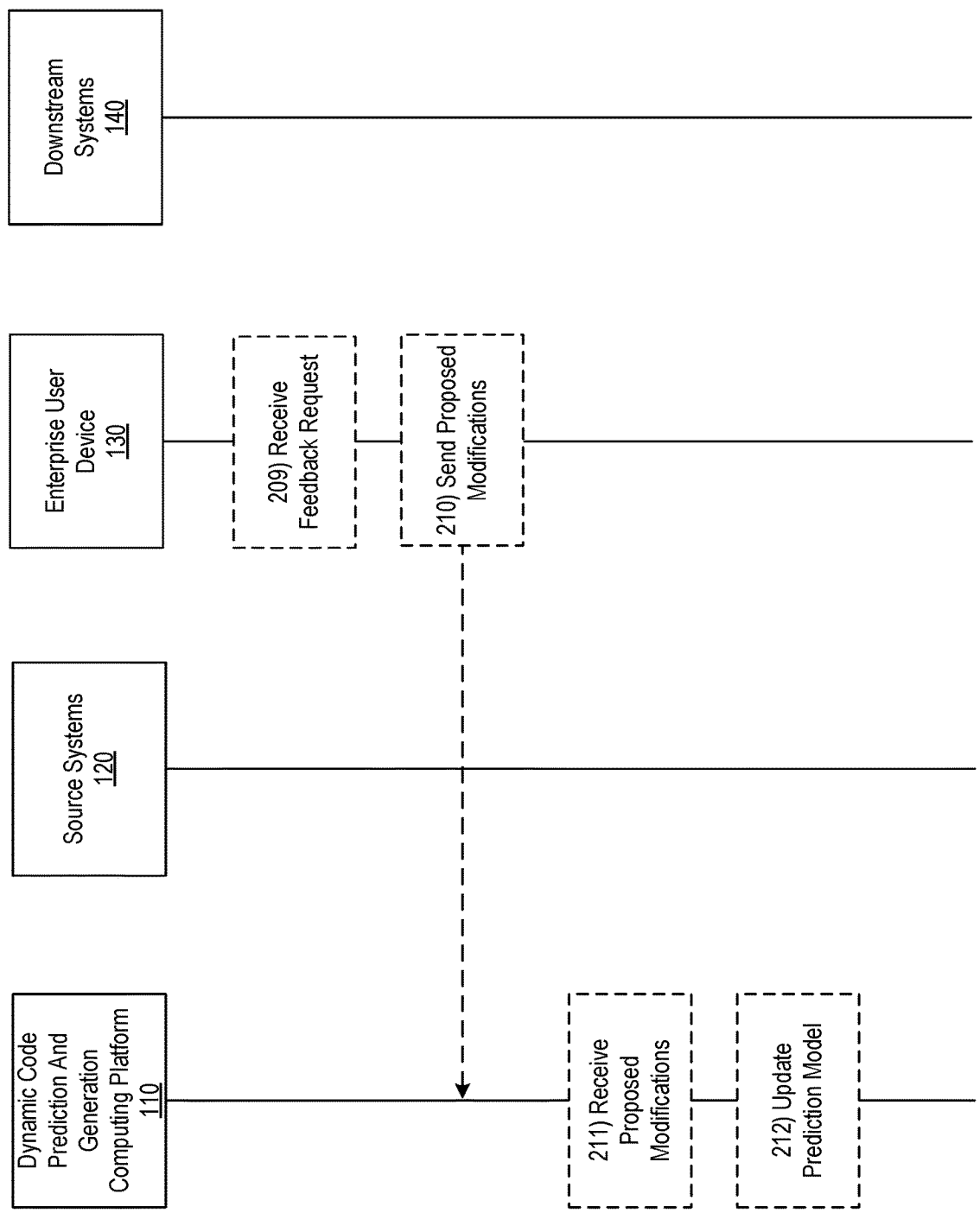

Referring to FIG. 2C, at step 209, the computing device associated with the subject matter expert may receive the feedback request. For example, the feedback request may include a request for the subject matter expert to validate the prediction model. At step 210, the computing device associated with the subject matter expert may send proposed modifications to the prediction model. For example, the proposed modifications may indicate suggestions for training and/or correcting the prediction model.

In turn, at step 211, dynamic code prediction and generation computing platform 110 may receive the proposed modifications to the prediction model from the computing device associated with the subject matter expert (e.g., enterprise user device 130). Subsequently, at step 212, dynamic code prediction and generation computing platform 110 may update the prediction model based on the proposed modifications. For instance, as additional or subsequent findings and/or suggestions are received, the prediction model may be validated and/or updated based on the received information. Accordingly, the system may continuously refine the prediction model, reinforce model accuracy, and the like, e.g., via reinforced learning.

Referring to FIG. 2D, at step 213, in response to determining that the confidence level is at or above the predetermined threshold, dynamic code prediction and generation computing platform 110 may generate executable transformation code implementing (e.g., adopting) the prediction model. For instance, the transformation code may be generated using a code object model (e.g., to generate code from the definition of a model independent of the programming language(s) to be used).

At step 214, dynamic code prediction and generation computing platform 110 may monitor transformation code implementations. For example, dynamic code prediction and generation computing platform 110 may periodically send code update requests to downstream systems 140 and receive code implementation updates from downstream systems 140.

At step 215, dynamic code prediction and generation computing platform 110 may execute a fourth machine learning algorithm to adjust the prediction model based on the transformation code implementations. In some embodiments, the first machine learning algorithm, the second machine learning algorithm, the third machine learning algorithm, the fourth machine learning algorithm may include different machine learning algorithms.

Figure 2E:
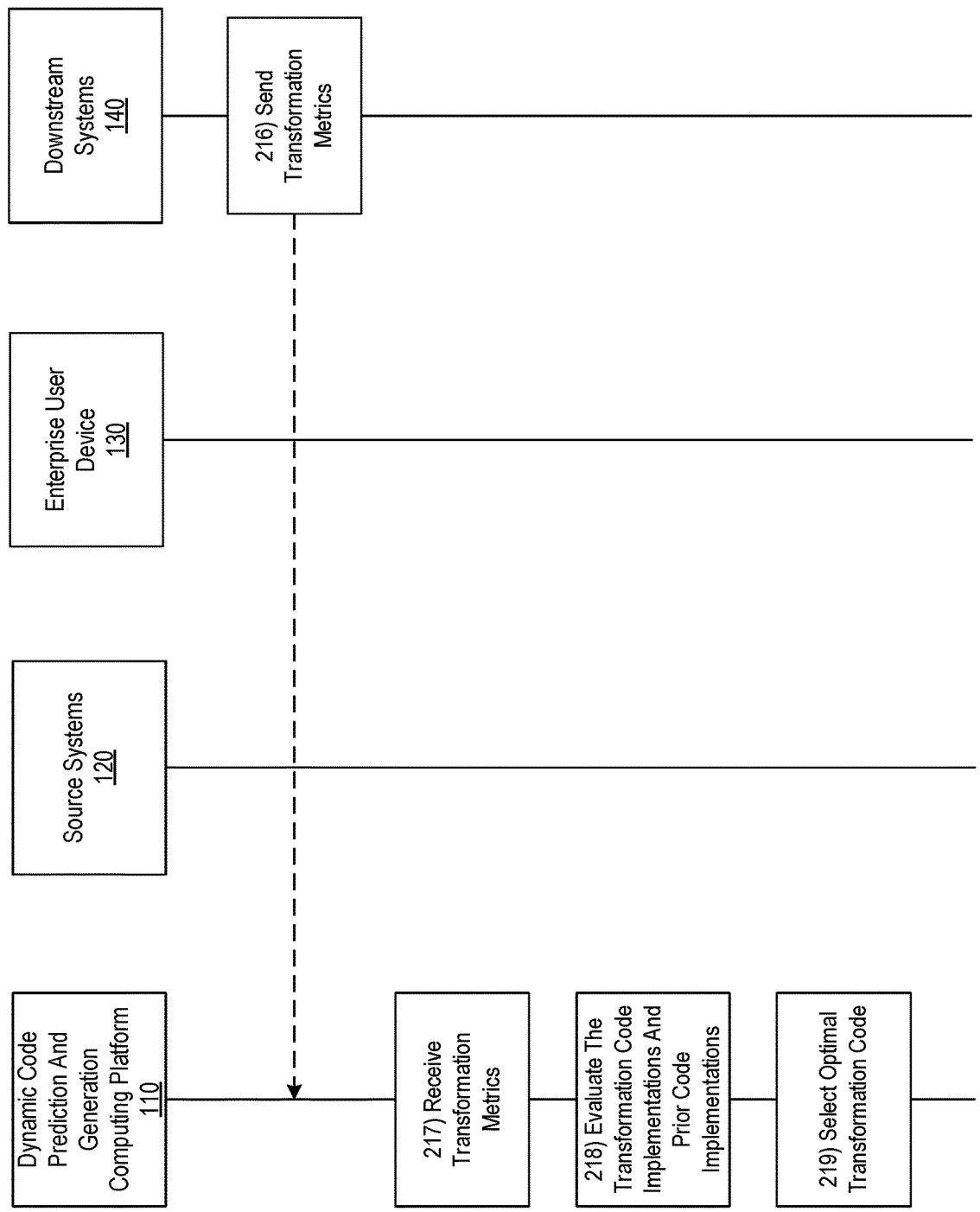

Referring to FIG. 2E, at step 216, in some embodiments, downstream systems 140 may send first transformation metrics for the transformation code implementations. In turn, at step 217, in some embodiments, dynamic code prediction and generation computing platform 110 may receive the first transformation metrics for the transformation code implementations. In some embodiments, receiving the first transformation metrics for the transformation code implementations may include receiving information indicating success rates associated with the transformation code implementations, accuracy associated with the transformation code implementations, risk aspects associated with the transformation code implementations, or user acceptance associated with the transformation code implementations.

At step 218, in some embodiments, dynamic code prediction and generation computing platform 110 may evaluate the transformation code implementations and prior code implementations based on the first transformation metrics and second transformation metrics for the prior code implementations.

At step 219, in some embodiments, based on evaluating the transformation code implementations and the prior code implementations, dynamic code prediction and generation computing platform 110 may select an optimal transformation code from amongst the transformation code implementations and the prior code implementations (e.g., based on success rate and/or non-error prone code suggestions associated with the transformation code implementations and the prior code implementations). For example, dynamic code prediction and generation computing platform 110 may select the optimal transformation code to derive a missing value based on enterprise or user needs. The optimal transformation code may be identified as optimal based on one code implementation being better and/or faster relative to other available code implementations.

Accordingly, and as illustrated above, one or more aspects of the systems and methods described herein may be used to address technical difficulties associated with processing of missing and/or unexpected (e.g., irrelevant/junk) information. For example, by detecting missing and/or unexpected information in data, predicting a way to derive the logical derivation, dynamically generating and/or modifying code to derive a predicted value, and learning from the existing and/or derived derivation logic to use it in future, the intelligent processing described herein provides, among other advantages, an effective, efficient, scalable, and convenient technical solution for the prediction and generation of transformation code for an unavailable data element. Thereby, issues, errors, and/or warnings resulting from missing and/or incorrect data may be handled intelligently without or with minimal manual intervention, for example, by development and support teams, and the like.

Figure 3:
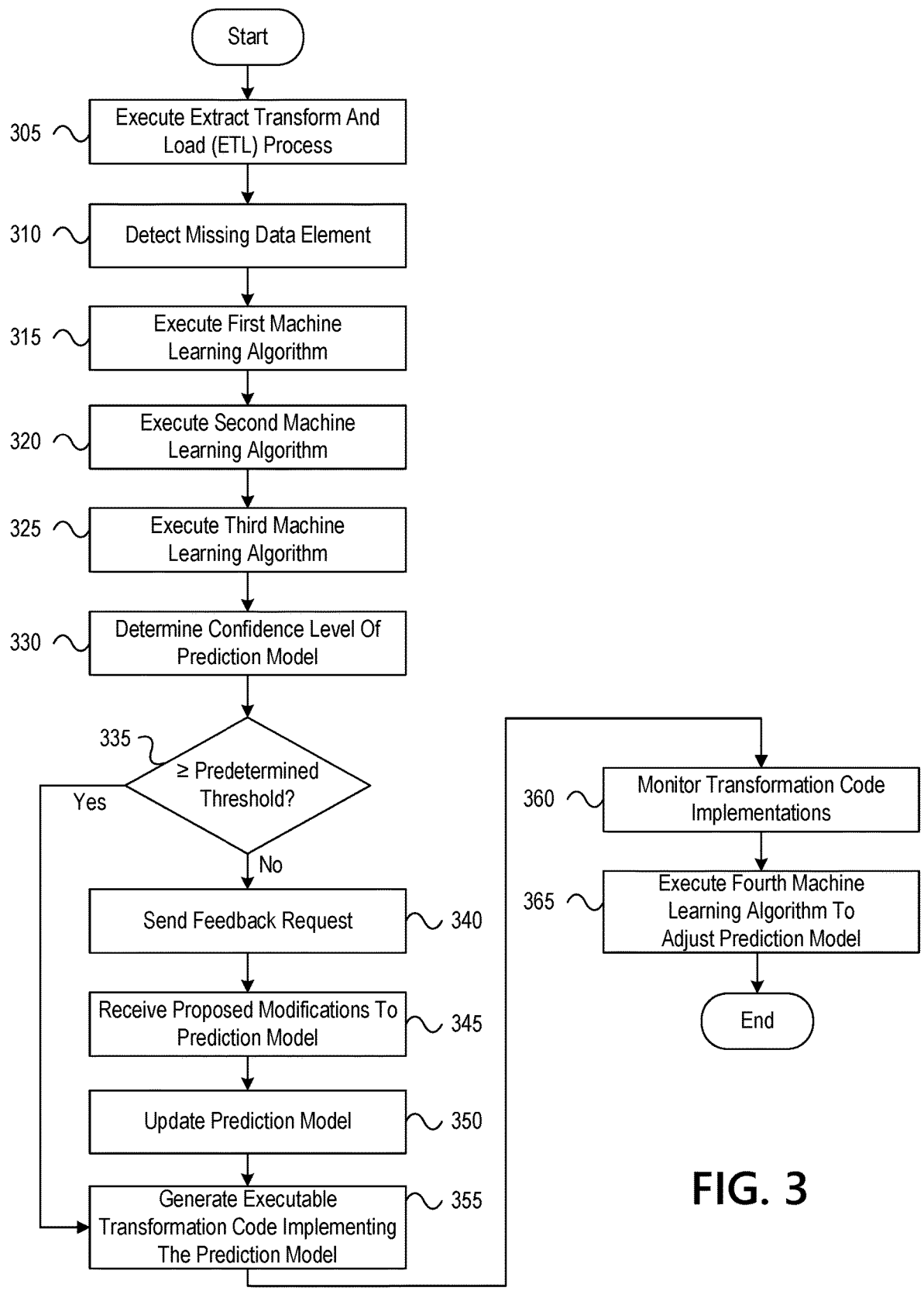
FIG. 3 depicts an illustrative method for dynamic transformation code prediction and generation for an unavailable data element in accordance with one or more example embodiments.

FIG. 3 depicts an illustrative method for dynamic transformation code prediction and generation for an unavailable data element in accordance with one or more example embodiments. Referring to FIG. 3, at step 305, a computing platform having at least one processor, a communication interface, and memory may execute an extract, transform, and load process on input data received from a plurality of data sources. At step 310, the computing platform may detect a missing data element in the input data received from the plurality of data sources. Next, at steps 315 through 325, the computing platform may generate a prediction model with respect to the missing data element. Specifically, generating the prediction model may include, at step 315, the computing platform executing a first machine learning algorithm to analyze stored historical information associated with the missing data element, at step 320, the computing platform executing a second machine learning algorithm to classify available information from the input data received from the plurality of data sources and, at step 325, the computing platform executing a third machine learning algorithm to correlate relationships between the missing data element and the available information from the input data received from the plurality of data sources. At step 330, the computing platform may determine whether the confidence level is at or above a predetermined threshold. At step 355, in response to determining that the confidence level is at or above the predetermined threshold, the computing platform may generate executable transformation code implementing the prediction model. Next, at step 360, the computing platform may monitor transformation code implementations. In turn, at step 365, the computing platform may execute a fourth machine learning algorithm to adjust the prediction model based on the transformation code implementations.

At step 340, in some embodiments, in response to determining that the confidence level is below the predetermined threshold, the computing platform may send, via the communication interface, a feedback request to a computing device associated with a subject matter expert. In addition, the feedback request may request the subject matter expert to perform a validation operation on the prediction model. Next, at step 345, the computing platform may receive, from the computing device associated with the subject matter expert, proposed modifications to the prediction model. In turn, at step 350, the computing platform may update the prediction model based on the proposed modifications.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
   at least one processor;
   a communication interface communicatively coupled to the at least one processor; and
   memory storing computer-readable instructions that, when executed by the at least one processor, cause the computing platform to:
   execute an extract, transform, and load process on input data received from a plurality of data sources;
   detect a missing data element in the input data received from the plurality of data sources;
   generate a prediction model with respect to the missing data element, wherein generating the prediction model comprises determining one or more components of the prediction model, including generating one or more of a predicted value or transformation logic capable of deriving a missing value, by:
   executing a first machine learning algorithm to analyze stored historical information associated with the missing data element,
   executing a second machine learning algorithm to classify available information from the input data received from the plurality of data sources, and
   executing a third machine learning algorithm to correlate relationships between the missing data element and the available information from the input data received from the plurality of data sources,
   based on generating the prediction model, determine a confidence level of the prediction model by comparing outputs of the first machine learning algorithm, second machine learning algorithm, and the third machine learning algorithm, wherein the confidence level indicates a level of accuracy of the prediction model;
   determine whether the confidence level is at or above a predetermined threshold;
   in response to determining that the confidence level is at or above the predetermined threshold, generate executable transformation code implementing the prediction model;
   monitor transformation code implementations; and
   execute a fourth machine learning algorithm to adjust the prediction model based on the transformation code implementations.

2. The computing platform of claim 1, wherein the memory stores additional computer-readable instructions that, when executed by the at least one processor, cause the computing platform to:

in response to determining that the confidence level is below the predetermined threshold:
send, via the communication interface, a feedback request to a computing device associated with a subject matter expert, the feedback request requesting the subject matter expert to perform a validation operation on the prediction model;
receive, from the computing device associated with the subject matter expert, proposed modifications to the prediction model; and
update the prediction model based on the proposed modifications.

3. The computing platform of claim 1, wherein the memory stores additional computer-readable instructions that, when executed by the at least one processor, cause the computing platform to:
receive first transformation metrics for the transformation code implementations;
evaluate the transformation code implementations and prior code implementations based on the first transformation metrics and second transformation metrics for the prior code implementations; and
based on evaluating the transformation code implementations and the prior code implementations, select an optimal transformation code from amongst the transformation code implementations and the prior code implementations.

4. The computing platform of claim 3, wherein receiving the first transformation metrics for the transformation code implementations comprises receiving information indicating success rates associated with the transformation code implementations, accuracy associated with the transformation code implementations, risk aspects associated with the transformation code implementations, or user acceptance associated with the transformation code implementations.

5. The computing platform of claim 1, wherein the missing data element comprises junk data or unexpected data.

6. The computing platform of claim 1, wherein executing the first machine learning algorithm comprises executing a supervised training algorithm.

7. The computing platform of claim 1, wherein executing the first machine learning algorithm comprises generating the predicted value using linear regression and adaptive boosting.

8. The computing platform of claim 1, wherein executing the second machine learning algorithm comprises generating the predicted value using an unsupervised clustering algorithm.

9. The computing platform of claim 1, wherein the executing the third machine learning algorithm comprises generating the transformation logic using one or more of: a data correlation algorithm, exploratory data analysis (EDA), or principal component analysis (PCA).

10. The computing platform of claim 1, wherein the first machine learning algorithm, the second machine learning algorithm, the third machine learning algorithm, the fourth machine learning algorithm comprise different machine learning algorithms.

11. A method, comprising:
at a computing platform comprising at least one processor, a communication interface, and memory:
executing, by the at least one processor, an extract, transform, and load process on input data received from a plurality of data sources;
detecting, by the at least one processor, a missing data element in the input data received from the plurality of data sources;
generating, by the at least one processor, a prediction model with respect to the missing data element, wherein generating the prediction model comprises determining one or more components of the prediction model, including generating one or more of a predicted value or transformation logic capable of deriving a missing value, by:
executing, by the at least one processor, a first machine learning algorithm to analyze stored historical information associated with the missing data element,
executing, by the at least one processor, a second machine learning algorithm to classify available information from the input data received from the plurality of data sources, and
executing, by the at least one processor, a third machine learning algorithm to correlate relationships between the missing data element and the available information from the input data received from the plurality of data sources,
based on generating the prediction model, determining, by the at least one processor, a confidence level of the prediction model by comparing outputs of the first machine learning algorithm, second machine learning algorithm, and the third machine learning algorithm, wherein the confidence level indicates a level of accuracy of the prediction model;
determining, by the at least one processor, whether the confidence level is at or above a predetermined threshold;
in response to determining that the confidence level is at or above the predetermined threshold, generating, by the at least one processor, executable transformation code implementing the prediction model;
monitoring, by the at least one processor, transformation code implementations; and
executing, by the at least one processor, a fourth machine learning algorithm to adjust the prediction model based on the transformation code implementations.

12. The method of claim 11, further comprising:
in response to determining that the confidence level is below the predetermined threshold:
sending, by the at least one processor, via the communication interface, a feedback request to a computing device associated with a subject matter expert, the feedback request requesting the subject matter expert to perform a validation operation on the prediction model;
receiving, by the at least one processor, from the computing device associated with the subject matter expert, proposed modifications to the prediction model; and
updating, by the at least one processor, the prediction model based on the proposed modifications.

13. The method of claim 11, further comprising:
receiving, by the at least one processor, first transformation metrics for the transformation code implementations;
evaluating, by the at least one processor, the transformation code implementations and prior code implementations based on the first transformation metrics and second transformation metrics for the prior code implementations; and based on evaluating the transformation code implementations and the prior code implementations, selecting, by the at least one processor, an optimal transformation code from amongst the transformation code implementations and the prior code implementations.

14. One or more non-transitory computer-readable media storing instructions that, when executed by a computing platform comprising at least one processor, a communication interface, and memory, cause the computing platform to:
   execute an extract, transform, and load process on input data received from a plurality of data sources;
   detect a missing data element in the input data received from the plurality of data sources;
   generate a prediction model with respect to the missing data element, wherein generating the prediction model comprises determining one or more components of the prediction model, including generating one or more of a predicted value or transformation logic capable of deriving a missing value, by:
      executing a first machine learning algorithm to analyze stored historical information associated with the missing data element,
      executing a second machine learning algorithm to classify available information from the input data received from the plurality of data sources, and
      executing a third machine learning algorithm to correlate relationships between the missing data element and the available information from the input data received from the plurality of data sources,
   based on generating the prediction model, determine a confidence level of the prediction model by comparing outputs of the first machine learning algorithm, second machine learning algorithm, and the third machine learning algorithm, wherein the confidence level indicates a level of accuracy of the prediction model;
   determine whether the confidence level is at or above a predetermined threshold;
   in response to determining that the confidence level is at or above the predetermined threshold, generate executable transformation code implementing the prediction model;
   monitor transformation code implementations; and
   execute a fourth machine learning algorithm to adjust the prediction model based on the transformation code implementations.

15. The one or more non-transitory computer-readable media of claim 14, wherein the instructions are configured to, when executed, further cause the computing platform to:
   in response to determining that the confidence level is below the predetermined threshold:
      send, via the communication interface, a feedback request to a computing device associated with a subject matter expert, the feedback request requesting the subject matter expert to perform a validation operation on the prediction model;
      receive, from the computing device associated with the subject matter expert, proposed modifications to the prediction model; and
      update the prediction model based on the proposed modifications.

16. The one or more non-transitory computer-readable media of claim 14, wherein the instructions are configured to, when executed, further cause the computing platform to:
   receive first transformation metrics for the transformation code implementations;
   evaluate the transformation code implementations and prior code implementations based on the first transformation metrics and second transformation metrics for the prior code implementations; and
   based on evaluating the transformation code implementations and the prior code implementations, select an optimal transformation code from amongst the transformation code implementations and the prior code implementations.

\* \* \* \* \*